I. S. SPENCER.
Thrashing Machine.
No. 15,786. Patented Sept. 23, 1856.
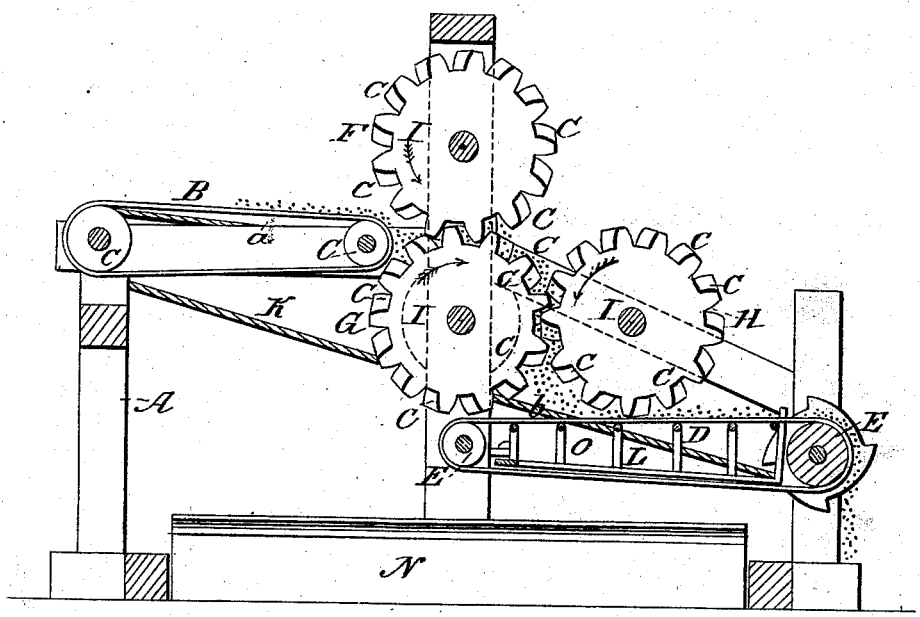
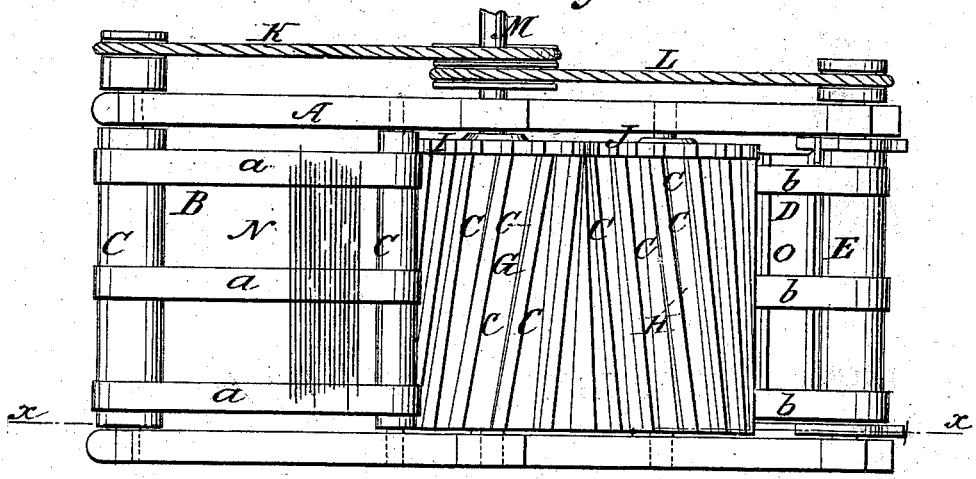

UNITED STATES PATENT OFFICE.

ISAAC S. SPENCER, OF GUILFORD, CONNECTICUT.

GRAIN-THRESHING MACHINE.

Specification forming part of Letters Patent No. 15,786, dated September 23, 1856; Reissued January 2, 1866, No. 2,141.

*To all whom it may concern:*

Be it known that I, ISAAC S. SPENCER, of Guilford, in the county of New Haven and State of Connecticut, have invented a new and Improved Grain-Threshing Machine; and I do hereby declare that the following is a full, clear, and exact description of the same, reference being had to the annexed drawings, making a part of this specification, in which—

Figure 1, is a longitudinal vertical section of my improvement; (*x*), (*x*), Fig. 2, showing the plane of section. Fig. 2, is a plan or top view of ditto; the top cylinder being removed.

Similar letters of reference indicate corresponding parts in the two figures.

My invention consists in the employment or use of threshing cylinders provided with ribs or flanches on their peripheries, said ribs or flanches being placed obliquely or angularly with the axes of the rollers as will be hereinafter fully shown and described whereby the grain is threshed from the straw in a perfect manner, and without injuring or breaking the straw.

To enable others skilled in the art to fully understand and construct my invention, I will proceed to describe it.

A, represents a framing which may be constructed in any proper manner to support the working parts.

B, represents an endless apron which may be constructed of a series of belts (*a*) placed around rollers C, C, at the front end of the framing; and D, represents an endless apron formed of belts (*b*) which pass over rollers E, E, at the back part of the framing the apron D, being considerably lower than the apron B, as plainly shown in Fig. 1.

F, G, H, represent three cylinders which are placed transversely in the framing A. Two of these cylinders, F, G, are placed one above the other, and the other cylinder, H, is placed on a horizontal line with the lower cylinder, G. The two cylinders F, G, have each a toothed wheel I, on one end, said wheels gearing into each other; and the cylinder H, has a toothed wheel J, at one end, which gears into the wheel of the cylinder G, as shown clearly in Fig. 1.

On the peripheries of the three cylinders F, G, H, there are placed ribs or flanches (*c*). These ribs or flanches are placed obliquely or angularly with the axes of the cylinders as shown in Fig. 2. These ribs or flanches gear into each other, and the ribs or flanches of one cylinder are in a reverse position to those of the adjoining one, see Fig. 2, so that the ribs or flanches of the three cylinders will form a perfect bearing or be allowed to gear into each other as the cylinders rotate; for instance, the cylinder G, see Fig. 2, has its ribs or flanches in a reverse position to those on cylinder H, and the ribs on the latter cylinder correspond in position to those on roller E.

The two endless aprons B, D, are driven by bands, K, L, from a pulley M, on the axis of the cylinder G.

The grain to be threshed is placed transversely on the apron B, and is fed by said apron between the cylinders F, G, and passes from between said cylinders down between the cylinders G, H, and the straw is discharged off the end of the apron D, the grain being threshed from the straw in a perfect manner and without breaking the straw, as the ribs pass over each other similar to a pair of shears and detach the grain from the straw. The grain falls upon an inclined bottom N, and collects at one side of the bottom of the framing A.

A proper shake screen O, is placed underneath the apron D.

The above invention is a decided improvement upon the machines in use, in which the ribs are placed parallel with the axes of the cylinders, as the straw is preserved in a perfect state equally as well as the straw from which the grain is threshed by the hand flail; by the ordinary machines the straw is completely broken.

I do not confine myself to any precise angle of the ribs or flanches (*c*), nor to the precise form; as they may be either curved or straight.

Having thus described my invention, what I claim as new and desire to secure by Letters Patent, is,

The cylinders F, G, H, provided with ribs or flanches (*c*), placed obliquely or angularly with their axes, substantially as described for the purpose specified.

ISAAC S. SPENCER.

Witnesses:
ALVAH B. GOLDSMITH,
RUFUS N. LEETE.

[FIRST PRINTED 1912.]